_US005919884A_

United States Patent [19]
Fink et al.

[11] Patent Number: 5,919,884
[45] Date of Patent: Jul. 6, 1999

[54] LIQUID SILICON RUBBER WITH LOW COMPRESSION SET

[75] Inventors: Peter Fink, Mehring; Richard Birneder, Simbach; Hedwig Schreiter, Tittmoning, all of Germany

[73] Assignee: Wacker-Chemie GmbH, Munich, Germany

[21] Appl. No.: 08/881,165

[22] Filed: Jun. 24, 1997

[30] Foreign Application Priority Data

Jul. 17, 1996 [DE] Germany .............................. 196 29 063

[51] Int. Cl.$^6$ .................................................. C08G 77/08
[52] U.S. Cl. ................................................. 528/15; 528/24
[58] Field of Search ........................................ 528/15, 24

[56] References Cited

U.S. PATENT DOCUMENTS 4,774,281  9/1988  Chaffee .

FOREIGN PATENT DOCUMENTS 0 415 180  3/1991  European Pat. Off. .
0 377 185  3/1995  European Pat. Off. .
0 432 761  5/1995  European Pat. Off. .

Primary Examiner—Melvyn I. Marquis
Attorney, Agent, or Firm—Brooks & Kushman P.C.

[57] ABSTRACT

The invention relates to compositions which crosslink to give elastomers and are based on component (A) comprising polyorganosiloxane (I) with at least two alkenyl groups per molecule and component (B) comprising polyorganosiloxane (II) with at least two silicon-bonded hydrogen atoms and organic per oxide (III).

7 Claims, No Drawings

LIQUID SILICON RUBBER WITH LOW COMPRESSION SET

BACKGROUND OF THE INVENTION

The invention relates to compositions which crosslink to give elastomers, to a process for their preparation and to shaped articles produced from these compositions.

Compositions which crosslink to give elastomers and which are said to have a low compression set are already known. EP 432 761 describes peroxide-crosslinking silicone elastomers to which an alkenylsilazane is added. EP-A 415 180 describes peroxide-crosslinking organopolysiloxanes with cerium compounds or magnesium oxide. U.S. Pat. No. 4,774,281 describes peroxide-crosslinking organopolysiloxanes which are crosslinked using hot air vulcanization. EP-B 0 377 185 describes a composition which is composed of a number of parts, where one part is a diorganopolysiloxane containing vinyl groups, another part is an organohydrosiloxane and an additional part is a platinum catalyst, and an organic peroxide which is present in amounts of at least 0.2% by weight. According to EP-B 0 377 185, the pot life of the catalyzed mixture is improved by cyclic vinylmethylsiloxanes.

All of these compositions have the disadvantage that either the compression set is too high or the reproducibility of the compression set after storage is too low.

BRIEF SUMMARY OF THE INVENTION

The object of the present invention is to provide a low compression set with simultaneous high reproducibility of the same after storage.

DETAILED DESCRIPTION OF THE INVENTION

The present invention relates to compositions which crosslink to give elastomers and are based on (A) a polyorganosiloxane (I) with at least two alkenyl groups per molecule, and (B) a polyorganosiloxane (II) with at least two silicon-bonded hydrogen atoms, and an organic peroxide (III).

Component (A) comprises polyorganosiloxane (I). Polyorganosiloxane (I) in the novel silicone rubber compositions is a polyorganosiloxane with at least two alkenyl groups per molecule and a viscosity at 25° C. which is in the range from 0.5 to 500 Pa·s, preferably from 1 to 100 Pa·s and more preferably from 7 to 25 Pa·s. Polyorganosiloxane (I) is used in amounts of between 10% and 98% by weight and preferably of between 20% and 80% by weight and more preferably of between 50% and 80% by weight.

Component (A) includes the metallic catalyst (IV) and may also include additional additives as described below.

Component (B) comprises polyorganosiloxane (II), an organic peroxide, and may include polyorganosiloxane (I) and additional additives as described below.

Polyorganosiloxane (II) in the novel silicone rubber compositions is a polyorganosiloxane with at least two Si—H groups per molecule and with a viscosity at 25° C. which is preferably in the range from 100 to 1000 mPa·s, more preferably from 200 to 500 mPa·s.

The polyorganosiloxane (I) is constructed from units of the formula $$R_a R^1_b SiO_{(4-a-b)/2},$$

where a is 0, 1 or 2, b is 0, 1, 2 or 3, with the proviso that at least two radicals R are present in every molecule and the sum (a+b) is $\leq 4$.

R is any alkenyl group which can undergo a hydrosilylation reaction with an SiH functional crosslinking agent. It is advantageous to use alkenyl groups with from 2 to 6 carbon atoms, such as vinyl, allyl, methallyl, 1-propenyl, 5-hexenyl, ethynyl, butadienyl, hexadienyl, cyclopentenyl, cyclopentadienyl, cyclohexenyl, preferably vinyl and allyl.

$R^1$ is a substituted or unsubstituted aliphatically saturated, monovalent hydrocarbon radical with from 1 to 10 carbon atoms, preferably from 1 to 6 carbon atoms, examples of which are the alkyl groups, such as methyl, ethyl, propyl, butyl and hexyl, cycloalkyl groups, such as cyclopentyl, cyclohexyl and cycloheptyl, aryl and alkaryl groups, such as phenyl, tolyl, xylyl, mesityl, benzyl, beta-phenyl-ethyl and naphthyl, and halogen-substituted groups, such as 3,3,3-trifluoropropyl, o-, p- and m-chlorophenyl, bromotolyl and beta-cyanoethyl.

The alkenyl groups may be bonded at any position in the polymer chain, in particular on the terminal silicon atoms.

Polyorganosiloxane (I) may also be a mixture of different polyorganosiloxanes which contain alkenyl groups, differing, for example in their alkenyl group content, in the type of alkenyl group or structurally.

The structure of the polyorganosiloxanes which contain alkenyl groups may be linear or branched. Besides monofunctional units, such as $RR^1_2SiO_{1/2}$ and $R^1_3SiO_{1/2}$, and difunctional units, such as $R^1_2SiO_{2/2}$ and $RR^1SiO_{2/2}$, branched polyorganosiloxanes also comprise, trifunctional units, such as $R^1SiO_{3/2}$ and $RSiO_{3/2}$ and/or tetrafunctional units of the formula $SiO_{4/2}$, where R and $R^1$ are as defined above. The content of these tri- and/or tetrafunctional units which lead to branched polyorganosiloxanes should not exceed 20 mol %. The polyorganosiloxane which contains alkenyl groups may also contain units of the formula —OSi$(R^2R^3)R^4Si(R^2R^3)O$—, where $R^2$ and $R^3$ are as defined above for R and $R^1$, and $R^4$ is a bivalent organic radical, such as ethylene, propylene, phenylene, diphenylene or polyoxymethylene. Units of this type may be present in the polyorganosiloxane (I) in a proportion of up to 50 mol %.

Preference is given to the use of polydimethylsiloxanes which contain vinyl groups and have the formula $$(ViMe_2SiO_{1/2})_2(ViMeSiO)_a(Me_2SiO)_b,$$

where a is zero or a non-negative integer and b is a non-negative integer, and the following relationships are fulfilled: $50<(a+b)<2200$, preferably $200<(a+b)<1000$.

The crosslinker used in the addition-crosslinking of the novel silicone rubber composition is polyorganosiloxane (II), which is preferably an SiH-functional polyorganosiloxane constructed from units of the following formula $$H_c R^1_d SiO_{(4-c-d)/2},$$

where c is 0, 1 or 2, d is 0, 1, 2 or 3, with the proviso that the sum (c+d) is <4 and that at least two hydrogen atoms bonded to silicon are present in each molecule, and $R^1$ is as defined above.

Preference is given to the use of a polyorganosiloxane which contains three or more SiH-bonds per molecule. If a polyorganosiloxane (II) containing only two SiH-bonds per molecule is used, the polyorganosiloxane which contains alkenyl groups (I) preferably contains at least three alkenyl groups per molecule.

The polyorganosiloxane (II) is used as crosslinker. The hydrogen content of the crosslinker, which relates exclusively to the hydrogen atoms bonded directly to silicon atoms, is in the range from 0.002% to 1.7% by weight of hydrogen, preferably from 0.1% to 1.7% by weight of hydrogen.

The polyorganosiloxane (II) preferably contains at least three and at most 600 silicon atoms per molecule. Preference is given to the use of SiH-crosslinkers which contain between 4 and 200 silicon atoms per molecule.

The structure of the polyorganosiloxane (II) may be linear, branched, cyclic or network-like. Linear and cyclic polyorganosiloxanes (II) are composed of units of the formulae $HR^1_2SiO_{1/2}$, $R^1_3SiO_{1/2}$, $HR^1SiO_{2/2}$ and $R^1_2SiO_{2/2}$, where $R^1$ is as defined above. Branched and network-like polyorganosiloxanes (II) contain, in addition, trifunctional units, such as $HSiO_{3/2}$ and $R^1SiO_{3/2}$, and/or tetra-functional units of the formula $SiO_{4/2}$. As the content of tri- and/or tetrafunctional units increases, these cross linking agents show a network-like, resin-like structure. The organic radicals $R^1$ in the polyorganosiloxane (II) are usually selected so that they are compatible with the organic radicals in the polyorganosiloxane (I), so that the constituents (I) and (II) are miscible.

Combinations and mixtures of the polyorganosiloxanes (II) described here may also be used as crosslinker.

Preferred polyorganosiloxanes (II) have the formula $(HR^1_2SiO_{1/2})_e(R^1_3SiO_{1/2})_f(HR^1SiO_{2/2})_g(R^1_2SiO_{2/2})_h$, where the non-negative integers e, f, g and h satisfy the following relationships: (e+f)=2, (e+g)>2, 5<(g+h)<200, and $R^1$ is as defined above.

Polyorganosiloxane (II) is present in the curable silicone rubber composition in an amount giving a molar ratio of SiH groups to alkenyl groups of from 0.5 to 5, preferably from 1.0 to 3.0.

Polyorganosiloxane (II) is used in amounts of from 0.1% to 15% by weight, preferably from 2% to 8% by weight, and more preferably from 3% to 6% by weight.

The metallic catalyst (IV) which is present in component (A) serves for the addition reaction (hydrosilylation) between the alkenyl groups of the polyorganosiloxane (I) and the silicon-bonded hydrogen atoms of the polyorganosiloxane (II). A large number of suitable hydrosilylation catalysts (IV) are described in the literature. In principle, any hydrosilylation catalyst which is conventionally used in addition-crosslinking silicon rubber compositions may be used.

The hydrosilylation catalyst (IV) may be a metal, such as platinum, rhodium, palladium, ruthenium or iridium, preferably platinum, which optionally may be supported on fine-particle carrier compositions, such as active carbon, alumina or silica.

Platinum and platinum compounds are preferred. Preference is given to platinum compounds which are soluble in polyorganosiloxanes. Soluble platinum compounds are, for example, the platinum-olefin complexes of the formulae $(PtCl_2.olefin)_2$ and $H(PtCl_3.olefin)$, where preference is given to alkenes having 2 to 8 carbon atoms, such as ethylene, propylene and isomers of butene and octene, or cycloalkenes with from 5 to 7 carbon atoms, such as cylcopentene, cyclohexene and cycloheptene. Other soluble platinum catalysts are the platinum-cyclopropane complex of the formula $(PtCl_2.C_3H_6)_2$, the reaction products of hexachloroplatinic acid with alcohols, ethers or aldehydes and/or mixtures of these, or the reaction product of hexachloroplatinic acid with methylvinylcyclotetrasiloxane in the presence of sodium bicarbonate in ethanolic solution. Particular preference is given to complexes of platinum with vinylsiloxanes, such as symdivinyltetramethyldisiloxane.

The hydrosilylation catalyst (IV) may also be used in microencapsulated form, where the fine-particle solid which contains the catalyst is insoluble in the polyorganosiloxane such as a thermoplastic resin or a silicone resin. The hydrosilylation catalyst may also be used in the form of an inclusion compound, for example in a cyclodextrin.

The amount of hydrosilylation catalyst used depends on the desired rate of crosslinking and on cost factors. If common platinum catalysts are used, the content of platinum metal in the curable silicone rubber composition is in the range from 0.1 to 500 ppm by weight, preferably from 10 to 100 ppm by weight of platinum metal. Otherwise, the catalyst may be used with an inhibitor, preferably in amounts of from 0.01% to 5% by weight.

The organic peroxide according to the invention is a peroxide of the formula $R^1$—O—O—$R^3$, where $R^1$ is as defined above and may be halogen-substituted, and $R^1$ and $R^3$ are identical; advantageous peroxides are, for example, di-tert-butyl peroxide, bis(tert-butylperoxyisopropyl) benzene, dicumyl peroxide or bis(tert-butylperoxy)hexane, where dicumyl peroxide and 2,5-dimethyl-2,5-bis (tertbutylperoxy)hexane are preferred and 2,5-dimethyl-2,5 bis(tert-butylperoxy)hexane is more preferred. Mixtures of these peroxides may also be used.

The organic peroxide or the mixture is used in amounts of from 0.01% to 0.19% by weight, more preferably from 0.08% to 0.1% by weight.

The following additives may also be present in one of the components A or B.

While the constituents (I)–(IV) are necessary constituents of the novel silicone rubber composition, further additives may optionally be present in the silicone rubber composition in a proportion of up to 50% by weight, preferably from 1% to 20% by weight. These additives, may, for example, be fillers, adhesion promoters, inhibitors, pigments, dyes, plasticizers etc.

Examples of fillers are reinforcing fillers, i.e. fillers with a BET specific surface area of at least 50 m$^2$/g, preferably from 50 to 500 m$^2$/g, more preferably from 150 to 300 m$^2$/g, such as pyrogenic silica, silicic acid hydrogels which have been dehydrated while maintaining their structure i.e., "aerogels", and other types of precipitated or pyrogenic silica; non-reinforcing fillers, such as fillers with a BET specific surface area of less than 50 m$^2$/g, such as quartz powder, diatomaceous earth, calcium silicate, zirconium silicate, zeolites, iron oxide, zinc oxide, titanium dioxide, aluminum oxide, calcium carbonate, magnesium carbonate, zinc carbonate, carbon black, mica, siloxane resins and chalk. The fillers which are mentioned may be hydrophobicized.

Examples of plasticizers are diorganopolysiloxanes which are liquid at room temperature, and are end-blocked by triorganosiloxy groups, such as dimethylpolysiloxanes which are end-blocked by trimethylsiloxy groups and have a viscosity at 25° C. of from 10 to 10,000 mpa·s.

Examples of further additives which may be present are quartz powder, diatomaceous earth, clays, chalk, lithopones, carbon blacks, graphite, metal oxides, metal carbonates, metal sulfates, metal powders, fibers, dyes, pigments and so forth.

In particular, resin-like polyorganosiloxanes which essentially consist of units of the formulae $R^5_3SiO_{1/2}$, $R^5SiO_{3/2}$ and/or $SiO_{4/2}$ and optionally $R^5_2SiO_{2/2}$, in a proportion of up to 50% by weight, preferably up to 20% by weight, based on the total weight of the silicone rubber, may be present. The molar ratio between monofunctional and tri- or tetrafunctional units in these resin-like polyorganosiloxanes is in the range from 0.5:1 to 1.5:1. Functional groups, in particular alkenyl groups in the form of $R^4R^5{}_2SiO_{1/2}$—and/or $R^4R^5{}_2SiO_{2/2}$—units, may also be present.

In particular, additives may be present which enable the pot life and the rate of crosslinking of the curable silicone rubber composition to be set to the desired value. Examples of these inhibitors and stabilizers, which are known are: acetylenic alcohols, such as ethynylcyclohexanol and 2-methyl-3-butyn-2-ol, polymethylvinylcyclosiloxanes, such as methylvinylcyclotetrasiloxane, low-molecular-weight siloxane oils with vinyldimethylsiloxy end-groups, trialkyl cyanurates, alkyl maleates, such as diallyl maleate and dimethyl maleate, alkyl fumarates, such as diethyl fumarate and diallyl fumarate, organic hydroperoxides, such as cumene hydroperoxide, tert-butyl hydroperoxide and pinane hydroperoxide, organic peroxides, benzotriazole, organic sulfoxides, organic amines and amides, phosphines, phosphites, nitriles, diaziridines and oximes.

The novel silicone rubber compositions are prepared by, in a first step, mixing the filler with the polyorganosiloxane (I) containing alkenyl groups to give a homogeneous mixture. The filler is incorporated into the polyorganosiloxane in a suitable mixer, e.g. a sigma blade mixer.

Components (A) and (B) are used in a weight ratio of from 10:1 to 1:0.5, preferably of 1:1.

The invention further relates to a process in which component (A) is mixed with component (B).

Components (A) and (B) are as defined above. The components are intensively mixed at room temperature (25° C.) and atmospheric pressure. The mixture is then vulcanized for from 0.1 to 10 min, preferably for 5 min, preferably at 170° C.

The invention further relates to a shaped article which comprises novel compositions or compositions prepared by the novel process.

The novel moldings are transparent, elastomeric moldings which can be colored if required, have good to very good mechanical properties and can be produced cost-effectively by the novel process. Moldings of this type are prepared by injection molding. Such moldings exhibit a lasting deformation on compression, the compression set. This deformation is especially large immediately following production, i.e. when heating is discontinued. In certain applications, e.g. gaskets in the automotive and engineering sectors, where on technical or cost grounds there is often no post-curing of the moldings, it is essential in particular in the case of non-post-cured moldings to achieve as low a compression set as possible. The invention achieves this object. However, post-curing is also possible according to the invention.

The good reproducibility of the compression set after storage if the organic peroxide is present in a small amount in component (B) is especially surprising. The rate of crosslinking in the novel moldings is higher than if the organic peroxide were present in component (A), even after relatively long storage times. This makes it possible to guarantee a shelf life of up to 6 months for the uncured product. The good shelf life therefore gives short, constant crosslinking times, which ensure fast and continuous production. This means that the processing machines do not have to be repeatedly adjusted to take account of longer crosslinking times which can otherwise result from storage, leading to considerable cost savings, and because of the short crosslinking time more moldings can be produced.

EXAMPLE 1 a) A component A was obtained by intimately mixing, at 25° C., 72 parts of a polydimethylsiloxane having terminal vinyldimethylsiloxy groups and a viscosity of 20 Pas, with 30 parts of a hydrophobicized pyrogenic silica with a surface area of 300 m²/g, 0.16 part of a platinum formulation containing polysiloxane and 0.07 part of ethynylcyclohexanol.

b) A component B was obtained by intimately mixing, at 25° C., 70 parts of a polydimethylsiloxane having terminal vinyldimethylsiloxy groups and a viscosity of 20 Pas, with 29 parts of a hydrophobicized pyrogenic silica with a surface area of 300 m²/g, 4.4 parts of a copolymer comprising dimethylsiloxane units, methylhydrogensiloxane units and trimethylsiloxane units and having a viscosity of 0.4 Pas, 0.07 parts of ethynylcyclohexanol and 0.2 part of 2,5-dimethyl-2,5-bis(tert-butylperoxy)hexane.

c) Components A and B were then mixed with one another in a weight ratio of 1:1. After a vulcanization time of 5 minutes at 170° C., sheets with thicknesses of 2 and 6 mm were produced from this mixture. The results are shown in the table.

EXAMPLE 2

(control example)

a) A component A was obtained by intimately mixing, at 25° C., 72 parts of a polydimethylsiloxane having terminal vinyldimethylsiloxy groups and a viscosity of 20 Pas, with 30 parts of a hydrophobicized pyrogenic silica with a surface area of 300 m²/g, 0.16 part of a platinum formulation containing polysiloxane, 0.07 part of ethynylcyclohexanol and 0.2 part of 2,5-dimethyl-2,5-bis(tert-butylperoxy)hexane.

b) A component B was obtained by intimately mixing, at 25° C., 70 parts of a polydimethylsiloxane having terminal vinyldimethylsiloxy groups and a viscosity of 20 Pas, with 29 parts of a hydrophobicized pyrogenic silica with a surface area of 300 m²/g, 4.4 parts of a copolymer comprising dimethylsiloxane units, methylhydrogensiloxane units and trimethylsiloxane units and having a viscosity of 0.4 Pas and 0.07 part of ethynylcyclohexanol.

c) Components (A) and (B) were then mixed with one another in a weight ratio of 1:1. After a vulcanization time of 5 minutes at 170° C., sheets with thicknesses of 2 and 6 mm were produced from this mixture. The results are shown in the table.

| | Compression set | | Shelf life | | |
|---|---|---|---|---|---|
| | C.S.* (%, non-post-cured) | C.S. (%, post-cured**) | t90 (sec, immediately) | t90 (sec, 1 month) | t90 (sec, 2 months) |
| Ex. 1 | 26 | 14 | 60 | 68 | 65 |
| Ex. 2 | 24 | 18 | 65 | 100 | 111 |

*Measurement of compression set: 22 h/175° C.
**Post-curing: 4 h/200° C.

The compression set is measured according to DIN 53517 and t90 denotes 90% crosslinking after the time in seconds given in the table.

What is claimed is:

1. A two component, addition crosslinkable organopolysiloxane composition which exhibits increased reproducibility after storage prior to cure, comprising:

A) a first component comprising
  A) 1) one or more organopolysiloxanes containing two or more alkenyl groups per molecule and
  A) 2) a metallic hydrosilylation catalyst; and
B) a second component comprising:
  B) 1) one or more organopolysiloxanes containing two or more Si—H bonded hydrogen atoms per molecule
  B) 2) from 0.01 to 0.19 weight percent of an organic peroxide, said weight percent relative to the total weight of components A) and B).

2. The two component, addition-crosslinkable organopolysiloxane composition of claim 1, wherein component B) further comprises one or more alkenyl-functional organopolysiloxanes.

3. The composition of claim 1, wherein said organic peroxide is 2.5-dimethyl-2,5-bis(tert-butylperoxy)hexane.

4. The two component, addition crosslinkable organopolysiloxane composition of claim 1 wherein said organic peroxide is present in an amount of from about 0.01 to about 0.1 weight percent.

5. The two component, addition crosslinkable organopolysiloxane of claim 4 wherein said organopolysiloxanes containing two or more alkenyl groups have a viscosity of 500 Pa·s or less.

6. A process for preparing an organopolysiloxane elastomer, comprising mixing component A) and component B) of claim 1 and curing to form an addition-crosslinked elastomer.

7. The composition of claim 1, wherein said organic peroxide is dicumylperoxide.

* * * * *